CONTACT PROTECTION CIRCUITS

Filed Dec. 30, 1953 3 Sheets-Sheet 1

INVENTORS: L. H. GERMER
J. L. SMITH

BY Hugh S. Wertz
ATTORNEY

Aug. 6, 1957 L. H. GERMER ET AL 2,802,149

CONTACT PROTECTION CIRCUITS

Filed Dec. 30, 1953 3 Sheets-Sheet 2

INVENTORS: L. H. GERMER
J. L. SMITH

BY Hugh S. Wertz
ATTORNEY

CONTACT PROTECTION CIRCUITS

Filed Dec. 30, 1953 3 Sheets-Sheet 3

INVENTORS: L. H. GERMER
J. L. SMITH

BY Hugh S. Wertz
ATTORNEY

United States Patent Office 2,802,149

Patented Aug. 6, 1957

2,802,149

CONTACT PROTECTION CIRCUITS

Lester H. Germer, Millington, and James L. Smith, Basking Ridge, N. J., assignors to Bell Telephone Laboratories, Incorporated, New York, N. Y., a corporation of New York Application December 30, 1953, Serial No. 401,354

11 Claims. (Cl. 317—11)

This invention relates to contact protection networks and more particularly to such networks adapted for use with direct current circuits.

It has previously been proposed to prevent contact erosion by the use of certain specific protective circuits. While many more complicated circuits have been employed, the simple series combination of a resistance and capacitance placed in shunt across the contacts in a cheap and effective contact protection circuit for many low current level applications, and has therefore been widely used. However, when the contacts must operate in the presence of oily vapors, when the current to be interrupted is more than about one-half ampere, or when the contacts chatter to a substantial extent, standard protection circuits have proved inadequate. For example, the life expectancy of contacts in certain telephone central office accounting equipment, in which the standard resistance-capacitance protection network is used, is less than a year, as compared with the usual life expectancy in telephone equipment contacts of 20 to 30 years or more. It is believed that this failure of the standard protection circuit is due to the chattering of the contacts and to their "activation" resulting from the presence of vapors from organic materials in the relay structure and from the lubricating oil and the waxed tape used in the equipment.

Accordingly, the principal object of the present invention is to prolong the life of contacts which are subject to adverse operating conditions.

The use of rectifier elements in protection circuits has also been proposed heretofore. However, the high capacitance, the high forward impedance, and the low breakdown voltage of the dry rectifier elements employed in prior art protective circuits have greatly limited their effectiveness.

A collateral object of the present invention is, therefore, to improve the operation of contact protection circuits employing rectifying elements.

In accordance with one aspect of the invention, contacts which control the flow of current in a direct current circuit are protected by a network including an inductance in series with the load and the contacts, and a capacitance connected across the direct current circuit. In addition, the protective network also includes a resistance in series or a diode in parallel with the inductance or both of these circuit additions. In accordance with another aspect of the invention, a p-n junction type semiconductor diode is employed in contact protection circuits to improve the operation of the protective network.

Other objects and certain features and advantages of the various embodiments of the invention will be developed in the course of the detailed description of the drawings.

In order to facilitate a discussion of the contact protective circuits in accordance with the present invention, a few pertinent prior art circuits will be considered briefly. To start at the beginning, it is enlightening to consider what will happen to contacts having no protective network, which control an inductive direct current load. In the absence of high distributed cable capacitance there will be no arcing and the contacts will not be damaged when they come together. On "break," however, when the contacts are separating, the voltage across the contacts and the series inductance causes a continuing current flow resulting in an arc which severely damages the contacts. This arc stops when the contacts become widely separated.

It is believed that the first contact protective network was a condenser bridged directly across the contacts to absorb the current surge on contact separation. This successfully prevented arcing on "break", but on "make", with the condenser fully charged to a value equal to the direct current source voltage, the condenser discharged across the contacts as they closed to less than the minimum arcing distance.

Figure 1:
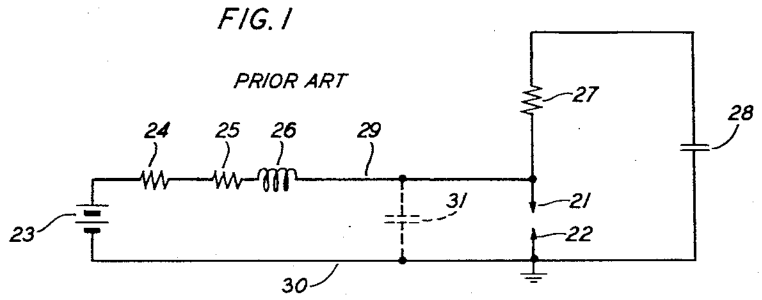
Figs. 1 and 2 represent prior art contact protective circuits.

The next step in the contact protection art is illustrated in Fig. 1 of the drawings. In this circuit, the contacts 21, 22 control the load circuit including the direct current source 23, and the load made up of the resistances 24 and 25, and the inductance 26. When the contacts open the current is diverted to the uncharged condenser 28 of the protective circuit, the efficiency of the circuit being slightly impaired by the presence of the resistance 27. On "make", however, the resistance 27 prevents arcing by limiting current flow from the fully charged condenser 28.

The protective circuit of Fig. 1 is quite adequate for many purposes and has been widely used. This standard protection arrangement is not suitable for some contact chattering conditions, however, and also has current limitations. With clean contacts the protective circuit of Fig. 1 is limited to currents of less than about one-half ampere, and with "active" or dirty contacts this network may be inadequate for currents greater than one-tenth of an ampere. In addition, if the leads 29 and 30 have substantial distributed capacitance, as illustrated by the condenser 31 shown in dashed lines, a large number of brief discharges may occur as the contacts close. This phenomenon is known as showering and appears to result from rapid charging and discharging of the cable capacitance.

The present protective networks are primarily designed for contact circumstances which the standard protection circuit of Fig. 1 cannot handle. As developed above this will involve, for specific example, circuits in which high currents are drawn, "active" or dirty contacts, chattering contacts, and circuits in which the leads have a relatively high capacitance.

Figure 2:
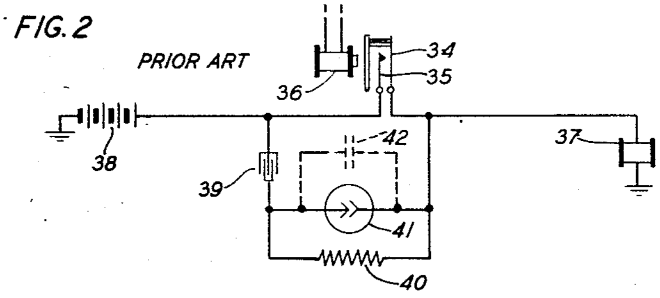

Fig. 2 represents an early (circa 1924) attempt to improve on the standard protective circuit of Fig. 1. In this figure, contacts 34, 35 are closed by relay 36 and interconnect the inductive load 37 and the battery 38. The protective circuit is made up of the condenser 39, the resistance 40 and the cell 41 which conducts better in one direction than the other. In theory this type of protection circuit should work admirably, because the rectifier 41 should permit charging of the condenser 39 directly on break, and should force current through the resistance 40 on make, preventing a direct discharge of the condenser across the contacts.

Circuits of the type shown in Fig. 2 are well known and have appeared in the patented art. It is equally well known among those skilled in the contact protection art that this type of circuit has been wholly unsatisfactory and has never been employed to any substantial extent. In view of the theoretically excellent protective properties of the circuit the present inventors undertook a study of its shortcomings in an effort to understand this paradox.

Analysis has revealed that two substantial difficulties encountered in prior attempts to utilize this circuit were the relatively high resistance of the common rectifier elements (copper or selenium oxide) in the so-called forward or low resistance direction and the low breakdown voltage in the reverse direction. In order to avoid breakdown and to obtain sufficiently low resistance in the forward direction for the circuit to be materially better than the standard protective circuit of Fig. 1 a large number of cells of large surface area must be placed in series. However, in addition to excessive size and cost, such an arrangement would have an unduly high inherent capacity because of the large surface area. This capacitance as indicated at 42 in Fig. 2 results in an effective capacitance directly across the contacts and causes arcing when the contacts close. Other diode units which have been proposed for this type of protective network are similarly ineffective or prohibitively costly.

Figure 3:
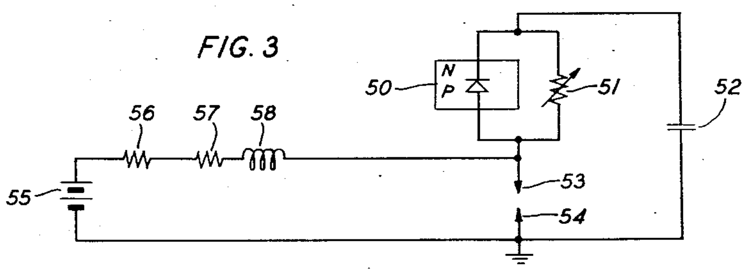
Fig. 3 is a contact protective circuit which employs a p-n semiconductor junction rectifier in accordance with the invention.

By way of example and for purposes of illustration Fig. 3 shows a protective circuit in accordance with the invention in which the difficulties inherent in the prior art circuits as detailed above have been solved. This has been accomplished by employing a p-n junction semiconductor diode 50 in the protective circuit which also includes the resistance 51 and the condenser 52, and operates to protect the contacts 53, 54. These contacts control the application of the source of direct current 55 to the load having the resistive components 56, 57 and the inductive component 58.

Table 1 which follows clearly points up the advantages of the protective circuit of Fig. 3. This table was developed from oscilloscope patterns, and the "life" data was corroborated by actual measurements of the weight of removable contacts before and after many operations with the indicated protective circuits.

EXPERIMENTAL DATA FOR RELAY CONTACTS

*Fully active palladium contacts in a half ampere circuit*

ENERGY AT THE CONTACTS (ERGS PER OPERATION)

| Protection (1) | Make (2) | Break (3) | Make plus Break (4) | Contact Life (Operations) (5) |
|---|---|---|---|---|
| (1) None | Small | 30,000 | 30,000 | $3\times10^6$ |
| (2) 0.55 μf. cond. plus 100 ohms | 700 | 20,100 | 20,800 | $4\times10^6$ |
| (3) 6 μf. cond. plus 100 ohms | 4,000 | 5,200 | 9,200 | $9\times10^6$ |
| (4) 6 μf. cond. plus p-n junc | <162 | None | <162 | $>500\times10^6$ |

In order to insure comparable contact activation in the tests noted above the contacts were operated in a tight enclosure with air at atmospheric pressure containing limonene vapor at a pressure of .05 mm. of mercury.

From a comparison of rows 3 and 4 of table 1, it may be readily seen that the protective circuit of Fig. 3 is far superior to the standard protective circuit of Fig. 1. Therefore, contrary to the expectations of those skilled in the art, the present inventors have produced an inexpensive diode circuit having excellent contact protection properties.

The p-n junction semiconductor 50 is of the general type described by W. Shockley in his article entitled "The theory of p-n junction in semiconductors and p-n junction transistors," pages 335–489, of volume 28 of the Bell System Technical Journal for July 1949. In addition to the material found in this article, the current technical literature describes many alternative materials and methods which may be employed in making p-n junctions. Characteristically, p-n junction diodes involve a rectifying barrier layer of substantial extent occurring within the body of a semiconductor (such as germanium, silicon, indium antimonide or etc.) at a boundary between that portion of the semiconductor in which there is an excess of donor impurities and that portion of the semiconductor body in which there is an excess of acceptor impurities. Although point contact diodes are specifically excluded from the class of p-n junction diodes, it is intended that the term shall include broad area p-n junctions within the body of a semiconductor even where the junction is very close to the surface of the body and may be formed, for example, by diffusing a portion of a broad area electrode into the semiconductor body as by suitable chemical or heating processes.

The properties of a representative one of the diodes which was employed in the tests mentioned hereinbefore included a reverse voltage breakdown point of more than 420 volts, a forward resistance of less than 10 ohms and negligible capacitance. In addition, p-n junctions can withstand substandard current surges in the forward direction without breakdown. In the circuit of Fig. 3 when the contacts separate, the surge from the inductance 58 will charge the condenser 52 well above the value of the source of direct voltage 55 and must then be blocked by the p-n junction. Thus in telephone circuitry where source 55 is 48 volts, inductance 58 is a one henry relay winding and condenser 52 is less than one microfarad, the reverse voltage breakdown point of the p-n junction must be well over 100 volts. The parallel combination of the resistance 51 and the back resistance of the diode 50 controls the rate of discharge of the condenser 52. This combination resistance should be a thousand ohms or more and can be adjusted to the proper value for a particular p-n diode by varying the resistance 51. If the back resistance of the diode 50 is of the proper order of magnitude (about 5,000 ohms) the resistance 51 may be made infinite and therefore may be omitted entirely.

When contacts chatter substantially, however, the circuit of Fig. 3 normally will not afford adequate contact protection. The physical reason for this may be understood by focussing attention on the large size of the composite resistance of the diode and the resistor 51 necessary to prevent arcing from the condenser 52 when the contacts close. This large resistance means that it takes a relatively long time for the discharge of the condenser 52 to a point below the minimum arcing voltage. For specific example, assuming a minimum arcing current of 0.1 ampere (for active palladium contacts), an arc voltage of 14 volts, source 55 equal to 48 volts, a condenser 52 of 6 microfarads, and the combination resistance of elements 50 and 51 equal to 5,000 ohms, chatter could not occur safely until after 37,000 microseconds have elapsed. Inasmuch as most chatter occurs within this time period before the condenser is sufficiently discharged, the circuit of Fig. 3 is not suitable for chattering contacts.

Figure 4:
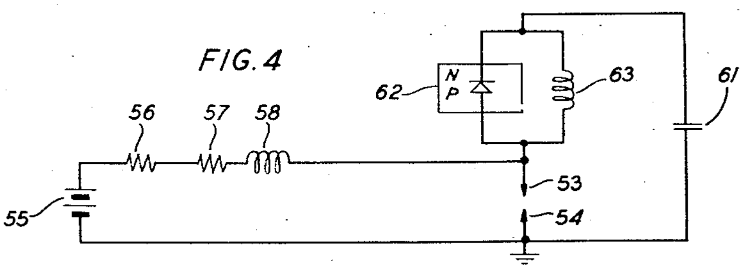
Fig. 4 is an improved version of the circuit of Fig. 3 in which an inductance is employed.
Figure 9:
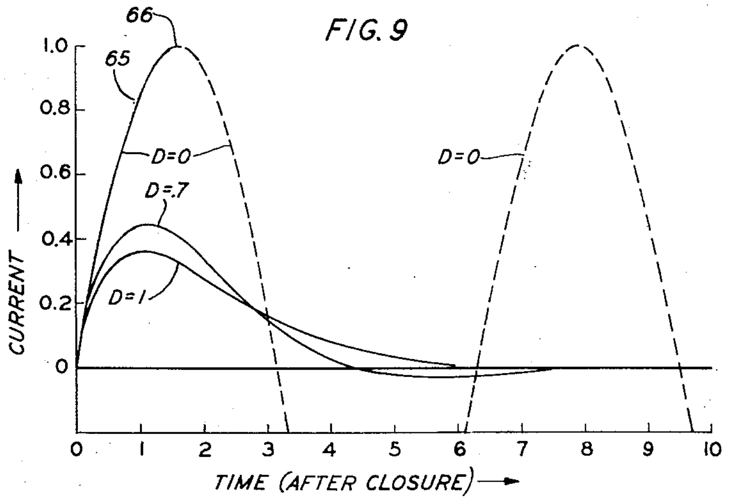
Figs. 9 and 10 are graphical representations of certain electrical characteristics which are useful in understanding the present contact protection networks.

The protective network of Fig. 4 is better adapted to protect chattering contacts than that of Fig. 3 because of the shorter time period for discharge of the protective condenser 61. The operation of this protective network, which also includes the p-n junction diode 62 and the inductance 63, may best be understood by referring to the chart of Fig. 9 of the drawings. The solid line plot 65 of Fig. 9 is a normalized plot of the variation of current through the tuned circuit made up of the condenser 61 and the inductance 63 of Fig. 4 as a function of time after the contacts close. At point 66 on the plot 65 the polarity of the voltage across the p-n junction reverses and the energy in the tuned circuit is quenched or dissipated in the p-n junction diode 62. The elapsed quarter period of the oscillating circuit is but 45 microseconds, assuming a four microfarad condenser 61 and a 200 microhenry coil 63. Now, if the contacts chatter at any time after 45 microseconds have elapsed, the condenser 61 will be discharged and the circuit will protect much as on a normal contact opening. While a particular contact chattering situation may have the first chatter open before 45 microseconds, and the contacts will therefore not be protected, the illustrated protective network of Fig. 4 is adequate for chatter conditions in which there is no chatter within 45 microseconds after initial closure.

Figure 10:
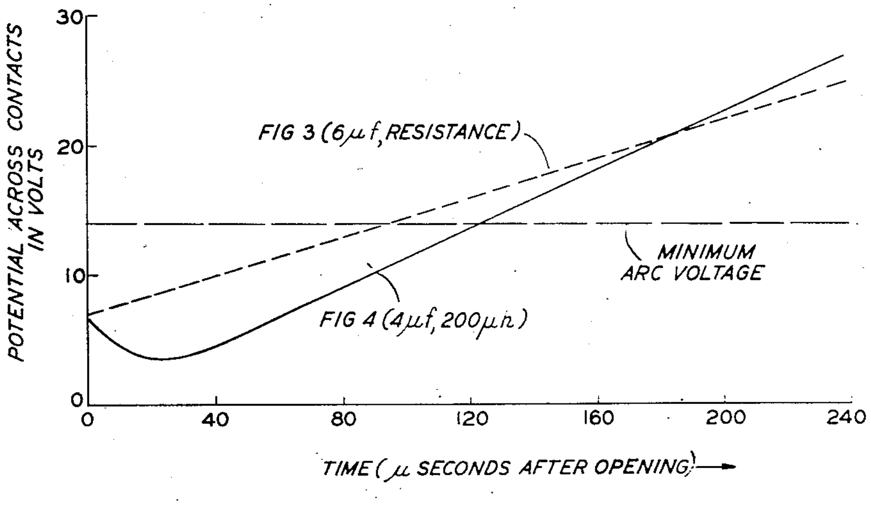

When the contacts of the circuits of Figs. 3 and 4 separate, or "break," the protective condenser absorbs the current surge, and the voltage across the contacts gradually builds up as the condenser is charged. This situation is illustrated for Figs. 3 and 4 in the plots of Fig. 10 by the dashed and solid lines, respectively. The dashed line plot corresponding to the network of Fig. 3 assumes a condenser 52 of 6 microfarads and a p-n junction diode 50 having a forward impedance of 15 ohms. In Fig. 10, the solid line plot corresponding to the protective network of Fig. 4 assumes a 4 microfarad condenser 61, a 200 microhenry coil 63 and a p-n junction diode 62 having the same forward impedance of 15 ohms. Although the forward impedance of the diode varies substantially with varying current, the assumption of a constant resistance is suitable for these plots; the value of 15 ohms was determined by the 0.45 ampere drawn by the diode with an applied potential of 7 volts. With reference to Fig. 10 arcing occurs in either Fig. 3 or 4 because the contacts are separating and the arc voltage increases more rapidly than the potential across the contacts.

Figure 5:
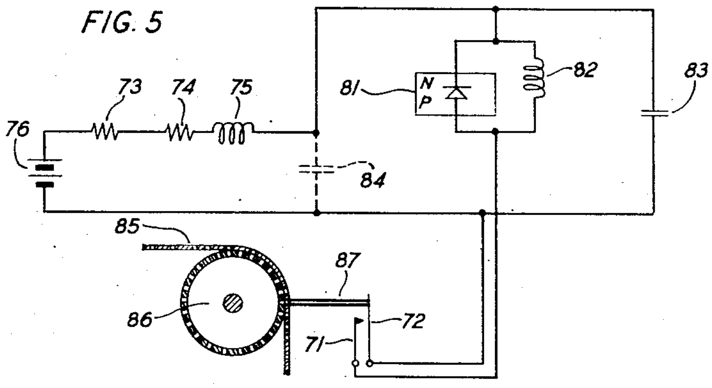
Fig. 5 represents one of the preferred embodiments of the invention, in which the inductance is in series with the contacts and the load circuit.

Fig. 5 illustrates one preferred form of the invention in which improved results are obtained by locating a protective network of the Fig. 4 type at a different point in the circuit. In Fig. 5 the contacts 71, 72 control the energization of the load 73, 74, 75 by the source of direct current 76. The protective network is made up of the parallel combination of the p-n junction diode 81 and the inductance 82 in series with the load circuit and the contacts, and the condenser 83 directly across the load circuit. The substantial cable capacitance of the load circuit is indicated by the dashed capacitance 84.

Figure 6:
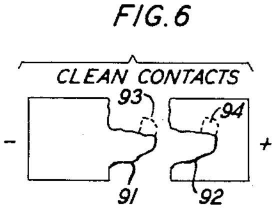
Figs. 6 and 7 illustrate contact erosion as it occurs in clean, and in active (or dirty) contacts, respectively.
Figure 7:
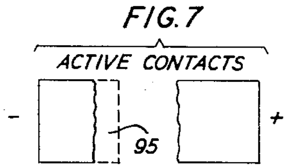

The contacts 71, 72 are not clean but are active as a result of vapors from the phenol fiber in the relay structure, the impregnated perforated tape 85, or the lubrication for the mechanically operated roller 86 and feeler linkage 87. Inasmuch as means for activating contact surfaces, such as the factors mentioned above, are often present where contacts are operated, Figs. 6 and 7 have been added to indicate the effect of contact arcing on inactive and active contacts respectively. In addiiton to the reduction of the arcing current for active contacts as compared with inactive contacts there is a difference in the erosion process for the two types of contacts. When the contacts are clean, as indicated in Fig. 6, there is a direct transfer of metal from the positive electrode to the negative electrode. This results in the formation of peaks and valleys as indicated by the peak 91 and the valley 92 on the negative and positive terminals respectively of Fig. 6. Under these conditions contact failure can result from interlocking metal transfer as indicated in dashed lines at 93, 94. In active or dirty contacts, however, much of the contact material is not transferred but merely is vaporized from the negative contact as indicated at 95 in Fig. 7. Because the arcing occurs at the high point of the negative contact, the active contacts tend to wear evenly and are not subject to failure from interlocking as noted in respect to the clean contacts of Fig. 6.

Returning to the circuit of Fig. 5, the protective network operates much like that of Fig. 4 when the contacts 71, 72 close, with the sinusoidal current set up in the condenser 83 and inductance 82 being dissipated in the p-n diode 81 one quarter cycle after the contacts close. However, the arrangement of the protective network elements in the circuit of Fig. 5 yields several contact protection advantages not present in the circuit of Fig. 4. Specifically, as detailed hereinafter, it protects against "showering" on closure which would otherwise result from the high cable capacitance of the load circuit, and is more effective than the circuit of Fig. 4 in protecting against certain types of chatter.

The term "showering" is applied to the repeated discharges of the distributed capacitance as the contacts close. What apparently happens is that the distributed capacitance discharges in a brief arc across the contacts, is then recharged from the direct current source, and discharges again. Oscillograph patterns indicate that this showering phenomenon may produce as many as 20 or 30 or more separate arc discharges across contacts as they close. With the inductance 82 of Fig. 5 located between the distributed capacitance 84 and the contacts 71, 72, this cable capacitance 84 is isolated and is effectively lumped together with the protective condenser 83, and showering is inhibited.

Late chatter or a brief opening of the contacts resulting from vibration or shock constitute another adverse operating condition. To analyze the results of this condition on contacts protected by networks such as are disclosed in Figs. 4 and 5, reference to the solid line plot of Fig. 10 will be useful. If the contacts have been closed long enough for the current to be built up to the steady value of 0.45 ampere then the plot of contact potential versus time will be exactly that shown by the solid curve of Fig. 10 for both Figs. 4 and 5. Otherwise the potential rise will be similar but at a lower rate. There is, however, an important difference in the action of the contacts. Whereas in a normal break the contacts are separating at a continually accelerated rate, at a chatter open the contacts separate only slightly and ultimately reclose. Thus one can see that for the circuit of Fig. 4 a late chatter open (or a shock opening) must not last longer than 125 microseconds if there is to be no arc. The situation is quite different for the circuit of Fig. 5 where the inductance 82 is in series with the direct current load circuit and the contacts. Even if the contact potential exceeds the arc voltage, the contacts are still protected from arcing by the series inductance 82. The protection is just like that afforded for normal contact closure, with the added advantage that the potential is not the full circuit voltage but only that to which the condenser has been charged.

Figure 8:
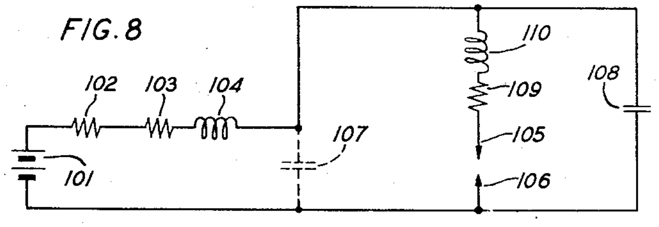
Fig. 8 is a simplified version of the present protective circuit.

The circuit of Fig. 8 is essentially a simplification of the circuit of Fig. 5 in which the p-n junction diode is omitted. This simple and inexpensive circuit is not as effective as the circuit of Fig. 5 for protection against certain types of adverse contact conditions, such as early chatter, but if there is no chatter which is too early in time after initial closure it is far superior to the standard protective circuit of Fig. 1 for protecting active contacts in a one-half ampere circuit.

In Fig. 8 the source of direct current is applied to the load circuit comprising the resistance 102, 103 and the inductance 104 when the active contacts 105 and 106 are closed. The condenser 107 indicates the distributed capacitance of the cable interconnecting the load circuit and the contacts. The protective network includes the condenser 108 in parallel with the load circuit, and the resistance 109 and coil 110 in series with the contacts and the load. The resistance 109 is moderately low, and may be included in the coil resistance.

The network made up of a capacitance 108, an inductance 110 and a resistance 109 having properly selected values will give excellent protection for active contacts breaking a half ampere inductive load, provided there is no chatter open occuring very soon after contact closure. The time after closure during which the contacts are not protected is proportional to $(CL)^{1/2}$ where C and L are the capacitance and inductance of the protective network. The possibility of protection failure on chatter is minimized by making the product CL as small as possible, consistent with L being large enough to prevent sustained arcing on make, and C being large enough for protection on break. These values can readily be determined experimentally; for example, with fully active contacts and a one-half ampere inductive load, L may be slightly less than 200 microhenries and C may be slightly less than 4 microfarads.

Concerning the value of the resistance 109, the plots of Fig. 9 indicate current versus time for three different values of damping resistance in terms of $D=R/(4L/C)^{1/2}$, where R, L, and C are the resistance 109, the inductance 110 and the capitance 108, respectively of the protective network. The three plots indicate no damping resistance ($D=0$), the critical damping resistance ($D=1$), and a value for the resistance 109 equal to a major fraction, or between one-half and one times the critical damping resistance of the LC circuit ($D=0.7$). Inspection and calculation indicate that a value of D in the range of the third plot serves to reduce the current to a low value as quickly as possible. Using $C=4$ microfarads, $L=200$ microhenries, and $D=0.7$, the resistance 109 (including the resistance of the coil 110) should be approximately 10 ohms. In terms of contact life the circuit of Fig. 8 turns out to be approximately 15 times better than the standard protective circuit of Fig. 1 for active contacts in a one-half ampere inductive circuit.

Figure 11:
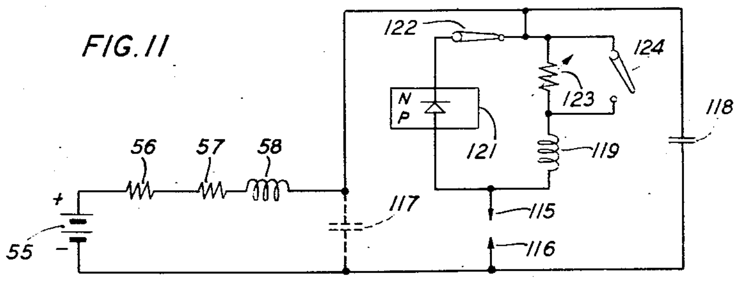
Fig. 11 shows another alternative contact protection arrangement.

Fig. 11 indicates a circuit in which the protective network for the contacts 115, 116 may be varied. The load circuit to be controlled by the contacts 115, 116 includes the source of direct current 55, the resistances 56, 57, and the inductance 58. The cable capacitance is indicated by the dashed condenser 117. The protective circuit includes the condenser 118, the inductance 119, the diode 121 with its associated series switch 122, and the variable resistance 123 with its associated parallel switch 124. The switches in the protective network of this circuit permit the duplication of other simpler protective circuits shown in earlier figures of the drawings. In addition, with switch 122 closed and switch 124 open a four element protective circuit is produced which has a damped oscillation and a diode squelching effect when the contacts close. Such a circuit is useful when a possibility of very early chatter exists and it is desirable to limit the current flow to a value well below that indicated by pilot 65 of Fig. 9 for the undamped oscillation.

Figure 12:
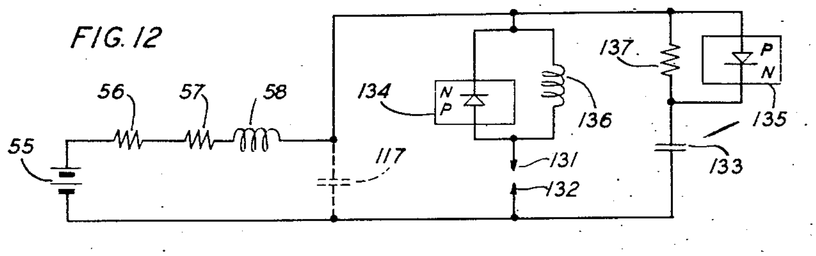
Fig. 12 illustrates a protective network employing two p-n junction semiconductor diodes which is another preferred embodiment of the invention.

The circuit of Fig. 12 represents a preferred embodiment of the invention which operates much like the circuit shown in Fig. 11. When a moderately large resistance is employed in the protective network of Fig. 12 it has certain advantages described below. In this circuit the contacts 131, 132 control the usual load circuit comprising the source of direct current 55, the resistive components 56, 57 and the inductive load element 56. On "break" the condenser 133 is charged directly through the diode 135, and the protection is unaltered by other elements in the circuit. On "make" the inductance 136 inhibits showering as in the simpler circuit of Fig. 5. The advantage over Fig. 11 is for contacts which have very early chatter, that is chatter open occurring very soon after closure. In the circuit of Fig. 11 a chatter open occurring before discharge of the capacitor 118 is completed results in serious arcing; in the circuit of Fig. 12, however, the current is always too low for arcing because of the resistance 137, and no chatter open can cause serious arcing. The resistance 137 must be of the order of magnitude of several hundred ohms to limit the capacitor discharge sufficiently. With this relatively high value of resistance, it must be placed in the shunt branch of the protective circuit as shown in Fig. 12 rather than in series with the contacts and load as indicated in Fig. 11 to prevent undue power dissipation under steady operating conditions. In addition, the resistance 137 may be replaced by an inductance.

By way of example and not of limitation the load circuits of Figs. 1, 3, 4, 5, 8, 11 and 12 are arranged to draw approximately one-half ampere. The load may be made up of a relay having an inductance of about one henry and a resistance of 16 ohms. In addition a 90 ohm dropping resistance is placed in series with the 48 volt direct current source to increase the speed of operation of the relay. The contacts in Figs. 3, 4, 5, 8, 11 and 12 are all to be considered as at least partially "active" as explained in detail in connection with Figs. 5 through 7.

It is to be understood that the above-described arrangements are illustrative of the application of the principles of the invention. Numerous other arrangements may be devised by those skilled in the art without departing from the spirit and scope of the invention.

What is claimed is:

1. A contact protection circuit comprising a pair of contacts to be protected, a direct current load circuit having two external terminals, a direct connection from one of said terminals to one of said pair of contacts, a circuit made up of a p-n junction rectifier and an inductance in parallel with each other connected between the other terminal of said load circuit and the other of said pair of contacts, and a condenser connected across the two terminals of said load circuit.

2. In a network for protecting an inductive direct current load circuit, a pair of contacts connected in series with the load circuit, a parallel combination of a p-n junction diode and an inductance in series with said contacts and said load, and a condenser connected across said load circuit.

3. In combination, a load circuit including an inductive load and means for applying a direct potential to said load, a pair of contacts, a connecting circuit having substantial distributed capacitance connecting said contacts and said work circuit series, means for activating said contacts, and a protective network for said contacts including the parallel combination of a p-n junction diode and an inductance in series with said contacts, and a condenser connected across the connecting circuit.

4. A combination as defined in claim 3 wherein resistive means are located in the circuit branch including said inductance.

5. A combination as defined in claim 3 wherein the parallel combination of a resistance and an additional p-n junction diode are placed in series with said condenser.

6. In a protective network for a direct current inductive load circuit, a pair of contacts controlling said load, a condenser connected to one of said contacts, and a parallel combination of an inductance and a p-n semiconductor junction diode connected in a series circuit with said condenser and the other of said pair of contacts.

7. In a protective network for a direct current inductive load circuit, a pair of contacts controlling said load, an inductance in series with said contacts and said load, a capacitance, resistive means; circuital means for connecting said contacts, said inductance, said capacitance and said resistive means in a series circuital loop; and a p-n junction diode connected across said inductance.

8. A protective network comprising a direct current source, an inductive load, means including a pair of contacts for controlling the application of direct current from said source to said load, an inductance in series with said contacts and said load, a capacitance, resistive means, and circuital means for connecting said contacts, said inductance, said capacitance and said resistive means in a series circuital loop.

9. A protective network comprising a direct current source, an inductive load, means including a pair of contacts for controlling the application of direct current from said source to said load, an inductance in series with said contacts and said load, a capacitance, resistive means, and circuital means for connecting said contacts, said inductance, said capacitance and said resistive means in a series circuital loop, the resistance of said resistive means being equal to a major fraction times the critical damping resistance of the tuned circuit made up of said inductance and said capacitance.

10. In a protective network for a direct current inductive load circuit, a pair of contacts controlling said load, an inductance in series with said contacts and said load, a capacitance, impedance means; circuital means for connecting said contacts, said inductance, said capacitance and said impedance means in a series circuital loop; and a p-n junction diode connected across said inductance.

11. In a network for protecting an inductive direct current load circuit, a pair of contacts connected in series with the load circuit, means for activating said pair of contacts, a parallel combination of a p-n junction diode and an inductance in series with said contacts and said load, and a condenser connected across said load circuit.

References Cited in the file of this patent

UNITED STATES PATENTS

| | | |
|---|---|---|
| 808,371 | Horry | Dec. 26, 1905 |
| 1,287,232 | Chubb | Dec. 10, 1918 |
| 1,357,257 | Slepian | Nov. 2, 1920 |
| 1,496,818 | May | June 10, 1924 |

FOREIGN PATENTS

| | | |
|---|---|---|
| 683,525 | Germany | Nov. 8, 1939 |